United States Patent [19]

Thornburg

[11] 4,118,112

[45] Oct. 3, 1978

[54] METHOD FOR REDUCING POWER DISSIPATION IN TAPERED RESISTOR DEVICES

[75] Inventor: David D. Thornburg, Los Altos, Calif.

[73] Assignee: Xerox Corporation, Stamford, Conn.

[21] Appl. No.: 747,124

[22] Filed: Dec. 3, 1976

[51] Int. Cl.$^2$ ................................................ G02F 1/13
[52] U.S. Cl. .................................... 350/351; 324/96; 338/7; 338/217
[58] Field of Search ................... 350/160 LC, 160 R; 324/96; 338/7, 217; 350/351

[56] References Cited

U.S. PATENT DOCUMENTS

| | | | |
|---|---|---|---|
| 3,149,281 | 9/1964 | Lief | 324/96 |
| 3,244,979 | 4/1966 | Hershinger | 324/96 |
| 3,546,491 | 12/1970 | Berglund | 307/310 X |
| 3,667,039 | 5/1972 | Garfein et al. | 350/160 LC |
| 4,006,414 | 2/1977 | Parker | 350/160 LC X |
| 4,059,774 | 11/1977 | Cohen | 338/7 X |

Primary Examiner—Edward S. Bauer
Attorney, Agent, or Firm—James J. Ralabate; Sheldon F. Raizes; Leonard Zalman

[57] ABSTRACT

A tapered resistor device which includes generally a tapered resistive film comprising a semiconducting material or other suitable material with a negative temperature coefficient of resistivity is provided. It is apparent with reference to the curves which show the variation of $\Delta E$ that large energy savings are possible at the narrow end of the taper with relatively small concomitant degradation in the temperature profile of the region of interest. It is therefore seen that employing a material with a negative temperature coefficient of resistivity provides an improvement in reducing power usage according to the principles of the instant invention.

1 Claim, 2 Drawing Figures

DISTANCE ALONG TAPER

METHOD FOR REDUCING POWER DISSIPATION IN TAPERED RESISTOR DEVICES

BACKGROUND OF THE INVENTION

This invention relates generally to a novel device having applications in a number and variety of technological areas including recording devices and the like, i.e., a tapered resistive element employed in combination with selected heat sensitive media and more specifically an improved tapered resistive element which effectively reduces the power consumption in the specific application employed.

In accordance with the general concept of the instant invention, a device comprising a tapered resistance element which develops a non-uniform temperature profile on electrical energization is interacted after being energized with selected heat sensitive media to provide a number of very useful effects and devices which may be employed in a great many applications with ease, simplicity and greater economy than heretofore possible. For example, the intrinsic simplicity and low cost of this device opens new areas of applicability for analog measuring equipment as well as in existing application areas. The specifics of this novel device and its many and varied applications are more specifically outlined in U.S. patent application Ser. No. 747,167 filed concurrently herewith which is hereby respectfully incorporated by reference.

Generally described therein, a conventional resistive device is seen to be a resistive film having a uniform thickness which has been formed into a resistor of a specified width and length. This film is then placed on an insulating substrate which is bonded to a heat sink. When an electrical current I is passed through the resistor the production of Joule heat causes a steady state temperature above ambient $\Delta T$ which if thermal fringing effects are neglected may be theoretically defined by the relationship $\Delta T = (d_s I^2 \rho_s)/(k_s W^2)$ (Eq. 1) in which $d_s$ and $K_s$ are respectively the thickness and thermal conductivity of the substrate and $\rho_s$ is the sheet resistivity of the resistive material measured in ohms/square. (Note: $\rho_s = \rho/d$ where $\rho$ is the bulk resistivity of the resistive material.) It is readily seen from this illustration that since the width of the resistor is uniform the local power dissipation and hence the temperature rise is also uniform so that no temperature gradient is established and the unique and utilizable effect of the device of the instant invention is not realized.

However, as is seen in FIG. 2 of the aforementioned U.S. Patent Application, a device may be provided including a resistive film which significantly has a varying width in the horizontal plane while the thickness remains uniform. This film may be placed on an insulating substrate which in turn is bonded to a heat sink. Now it is seen that the width of the resistive element is a monotonically increasing function of position along the length of the element or in simple terms the resistive element is tapered. In the event the slope of the taper is gradual over distances comparable with the substrate thickness equation 1 recited above will still be applicable for a first approximation. When a tapered resistor is energized the local power generation will vary along the length of the resistor so that points of prescribed temperature rise can be made to move along the tapered resistor by varying the current flowing through the device.

Although the non-uniformity of the width of the resistive film may vary in any suitable fashion, it is assumed for purposes of this discussion that the taper is linear so that the following relationship is theoretically true: $w = w_o + bx$  $0 < x < 1$ (Eq. 2) in which $w_o$ is the width at the narrow end of the taper, $b$ is the slope of the taper and $x$ is the distance along the resistor measured from the narrow end. Assuming that the tapered resistive element is in contact with for example a thermographic substance which undergoes a color change when heated to the temperature $T'$ or above as the current is increased in the tapered resistor a color line of $x'$ will be drawn. The length of this line may theoretically be derived as follows: The temperature differential $\Delta T'$ is defined as $\Delta T' = T' - T_{amb}$ where $T_{amb}$ is the ambient temperature. Combining equations 1 and 2 yields the relationship between the applied current and the distance $x'$ over which the tapered resistor will be heated to temperature $T'$ or above, i.e., $$x' = \frac{I(d_s\rho_s/k_s\Delta T')^{\frac{1}{2}} - w_o}{b} . \qquad \text{(Eq. 3)}$$

It is seen that when $w_o$ is greater than zero no region of the taper will be hotter than $T'$ for currents given by $$I < \frac{w_o}{(d_s\rho_s/k_s\Delta T')^{\frac{1}{2}}} . \qquad \text{(Eq. 4)}$$

Typically, tapered resistors employing the system of the instant invention have been provided employing resistive metal film such as for example $Ni_{80}Cr_{20}$ which has a constant resistivity over the temperature range of interest. For a gradual taper, the local temperature rise above ambient $\Delta T$ is substantially given by $\Delta T$ equals the quantity $Ai^2\rho_s$ all divided by $W^2$ in which A is a constant, $i$ is the current flowing in the tapered resistor, $\rho_s$ is the sheet resistivity of the resistor film and W is the taper width at the point of interest. In the event the given resistor employs a 3:1 taper $(W_{max}/W_{min}=3)$ when the midpoint temperature rise is $\Delta T_0$ the temperature rise at the narrow end is $4\Delta T_o$ and at the wide end is $4\Delta T_o/9$. If $\Delta T_o$ represents the threshold temperature rise needed to create the desired thermographic indication then any regions heated significantly above $\Delta T_o$ results in unnecessary power dissipation as can be readily understood.

Thus it is an object of the present invention to provide an improved tapered resistor device.

It is another object of this invention to provide an improved tapered resistor device which reduces the power dissipation in regions of the resistor which are above threshold temperature.

Yet another object of this invention is to provide a tapered resistor device which reduces power consumption and yet provides sharpness of the temperature gradient at the region heated to the threshold temperature.

Figure 1:
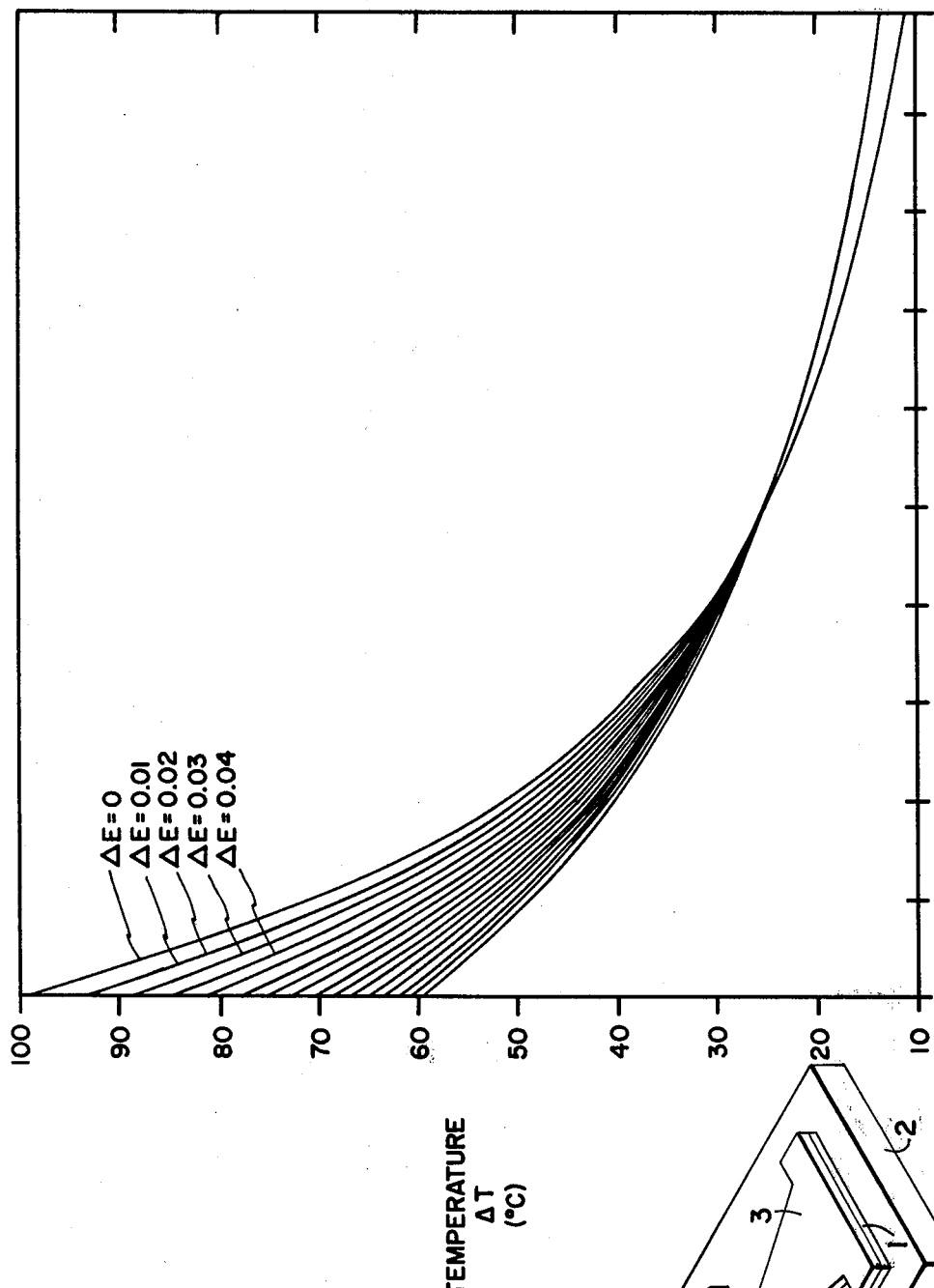
FIG. 1 is a plot of temperature distribution as a function of E.
Figure 2:
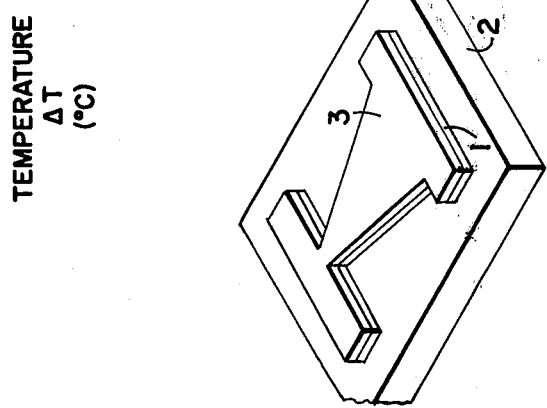
FIG. 2 shows schematically a tapered resistor device of the invention.

The foregoing objects and others are accomplished generally speaking by providing as shown in FIG. 2 a tapered resistor device which includes generally a tapered resistive film 1 comprising a semiconducting material or other suitable material with a negative temperature coefficient and resistivity which is supported by a substrate 2 and supports a layer of material 3 which undergoes a color change when heated beyond a threshold temperature. The mechanism of operation for the instant invention can be readily be seen by analysis of for example, the semiconducting film. If $\rho_s = \rho_{so} \exp(\Delta E/kT)$ then $\rho_s$ decreases when increasing temperature which is readily understood with reference to FIG. 1 where the temperature distribution is plotted as a function of $\Delta E$. In the instant model a 3:1 taper is employed and the temperature rise at the midpoint is 6° to 25° C. above the assumed ambient of 300° K. It should be noted that for a metal film ($\Delta E = 0$) $\Delta T_o$ equal 25° C. there results a maximum temperature rise at the narrow end of 100° C. If the taper were composed of a semiconducting material with $\Delta E = 0.01$ev, $\Delta T_o = 25$° C. would correspond to only a 96° rise at the narrow end. It is apparent with reference to FIG. 1 that large energy savings are possible at the narrow end of the taper with relatively small concomitant degradation in the temperature profile at the region of interest. It is therefore seen that any material with a negative temperature coefficient of resistivity is going to constitute an improvement in power dissipation according to the principles of the instant invention.

Any suitable material with negative temperature coefficients which may readily be prepared in film form either by vapor deposition, silk screening, plating or other conventional deposition methods may be employed in the tapered resistor device of the instant invention. Typical such materials include films of intrinsic germanium, films of tin oxide doped with antimony, pyrolytic carbon films, and materials called cermets, which include combinations of Cr, Au, Pt and other metals in SiO, SiO$_2$, WO$_3$, Ta$_2$O$_5$ and other suitable suitable insulators.

To further define the specifics of the present invention, the following illustrative examples are intended to illustrate and not limit the particulars of the present system. Parts and percentages are by weight unless otherwise indicated.

The following control example is hereinafter stated so that the power dissipation or reduction properties when practicing the system of the instant invention may be more nearly appreciated.

CONTROL EXAMPLE I

A borosilicate glass microscope slide 1 inch × 3 inch × 0.03 inch is coated with a thin nichrome (80 wt % Ni 20 wt % Cr) film by conventional flash evaporation technique. A tapered resistor is defined in the nichrome film by conventional photolithography and etching to produce a TRE 2.5 inches long and which tapers linearly from 0.040 to 0.080×inch in width over its length. Electrodes are connected from an external variable power source to each end of the resistor. The resistance of the TRE is 680Ω. The TRE is then coated with a layer of an encapsulated cholesteric liquid crystal film which undergoes a visible color change over the temperature at and above 50° C. This film is held to the TRE by the adhesive backing which came with the liquid crystal film. The bottom surface of the substrate is bonded to an Al plate 0.125×inch thick with double sided adhesive tape. A colored line is seen to form in the liquid crystal layer when the applied voltage exceeds 18 volts. The length of this line is voltage dependent and covers the entire length of the TRE when the applied voltage reaches 30V. The colored line disappears when the voltage is removed.

To further define the specifics of the present invention, the following example is intended to illustrate and not limit the particulars of the present system. Parts and percentages are by weight unless otherwise indicated.

EXAMPLE I

A procedure as outlined in control example I is again performed with the exception that amorphous cadmium arsenide is coated on the borosilicate glass microscope slide by physical vapor deposition. A tapered resistor is defined in the arsenide film by conventional photolithography and etching to produce a tapered resistor element or a TRE in accordance with control example I. Electrodes are then connected from an external variable power source to each end of the resistor. The TRE is then coated with a layer of an encapsulated cholesteric liquid crystal which undergoes a visible color change at the temperature 50° C. The film is held to the TRE by the adhesive backing of the liquid crystal itself. The bottom surface of the substrate is bonded to an aluminum plate as in control example I. A colored line is seen to form in the liquid crystal layer when the applied voltage causes the temperature at the middle of the TRE to exceed 50° C. The length of this line is voltage dependent and covers the entire length of the TRE when the applied voltage is increased. The colored line disappears when the voltage is removed. Compared to the device of control example I, when the temperature at the midpoint of the TRE is 50° C., the temperature at the narrow end of the TRE will only be about 70° C. for the semiconductor taper where it will be 125° C. for the control example.

Although the present examples were specific in terms of conditions and materials used, any of the above listed typical materials may be substituted when suitable in the above examples with similar results. In addition to the steps used to carry out the system of the present invention, other steps or modifications may be used if desirable. In addition, other materials may be incorporated in the system of the present invention which will enhance, synergize, or otherwise desirably affect the properties of the systems for their present use.

Anyone skilled in the art will have other modifications occur to him based on the teachings of the present invention. These modifications are intended to be encompassed within the scope of this invention.

What is claimed is:

1. An indicating device comprising:
    an electrically resistive element having a varying cross-sectional area along its length; and
    a heat sensitive material operatively associated with said resistive element, said heat sensitive material having the property that at least one of its physical characteristics can be changed upon heating beyond a threshold temperature, and
    said resistive element being of a material having a negative temperature coefficient of resistivity.

* * * * *